United States Patent
Butler et al.

(10) Patent No.: US 11,113,773 B2
(45) Date of Patent: Sep. 7, 2021

(54) SYSTEM AND METHOD FOR SHARING DIGITAL OBJECTS

(71) Applicant: Sony Interactive Entertainment LLC, San Mateo, CA (US)

(72) Inventors: Jeffrey Butler, Poway, CA (US); Roise Rappaport, San Diego, CA (US); Darrin McPherson, Oceanside, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 985 days.

(21) Appl. No.: 14/094,493

(22) Filed: Dec. 2, 2013

(65) Prior Publication Data

US 2014/0164227 A1 Jun. 12, 2014

Related U.S. Application Data

(60) Provisional application No. 61/734,305, filed on Dec. 6, 2012, provisional application No. 61/734,298, filed
(Continued)

(51) Int. Cl.
*G06Q 50/18* (2012.01)
*G06Q 20/12* (2012.01)
(Continued)

(52) U.S. Cl.
CPC ......... *G06Q 50/184* (2013.01); *G06Q 20/123* (2013.01); *G06Q 30/02* (2013.01);
(Continued)

(58) Field of Classification Search
CPC .... G06Q 30/06; G06Q 30/02; G06Q 30/0601; G06Q 30/0273; G06Q 30/0274;
(Continued)

(56) References Cited

U.S. PATENT DOCUMENTS 5,566,279 A * 10/1996 Katayama ............... G06T 15/06
345/419
5,629,980 A * 5/1997 Stefik ..................... G06F 21/10
705/54
(Continued)

FOREIGN PATENT DOCUMENTS

CN 101048210 A 10/2007
CN 101444038 A 5/2009
(Continued)

OTHER PUBLICATIONS

IBM Systems Journal, vol. 45, No. 1, 2006; "Online games and e-business: Architecture for integrating business models and services into online games"; C. E. Sharp and M. Rowe; (Year: 2006).*
(Continued)

*Primary Examiner* — Patrick McAtee
*Assistant Examiner* — Edgar R Martinez-Hernandez
(74) *Attorney, Agent, or Firm* — Polsinelli LLP

(57) ABSTRACT

Implementations of systems and methods according to present principles provide new ways to share digital objects in computing environments, improving the user experience and also enhancing communication and relationships among people. The "sharings" can occur as a transfer of an object from one user to another or the transfer of the object into an environment (or vice versa). In one example, a user in a game designs and builds a digital object for a tower and then sells the tower in the game. The tower becomes popular and is used by many other players of the game, including as a part of their own constructions, and also begins to appear in system-generated structures. The creator of the original tower, as well as creators of components constituting the tower, may be provided with compensation for their efforts from such sales of subsequent towers or constructions using such towers.

21 Claims, 10 Drawing Sheets

Related U.S. Application Data on Dec. 6, 2012, provisional application No. 61/734,290, filed on Dec. 6, 2012.

(51) Int. Cl.
   *G06Q 30/06* (2012.01)
   *G06Q 30/02* (2012.01)

(52) U.S. Cl.
   CPC ..... *G06Q 30/0236* (2013.01); *G06Q 30/0273* (2013.01); *G06Q 30/0274* (2013.01); *G06Q 30/0277* (2013.01); *G06Q 30/06* (2013.01); *G06Q 30/0601* (2013.01); *G06Q 30/0609* (2013.01); *G06Q 30/0643* (2013.01)

(58) Field of Classification Search
   CPC ........... G06Q 30/0609; G06Q 30/0236; G06Q 30/0277; G06Q 30/0643; G06Q 50/184; G06Q 20/123
   See application file for complete search history.

(56) References Cited

U.S. PATENT DOCUMENTS

| | | | | |
|---|---|---|---|---|
| 6,195,646 | B1* | 2/2001 | Grosh | G06Q 20/102 705/26.41 |
| 7,133,846 | B1* | 11/2006 | Ginter | G06Q 40/12 348/E5.006 |
| 7,703,673 | B2* | 4/2010 | Buchheit | G06Q 20/02 235/375 |
| 8,137,194 | B1* | 3/2012 | Kelly | A63F 13/85 463/1 |
| 8,217,938 | B2* | 7/2012 | Chen | G06T 17/20 345/419 |
| 8,244,595 | B2 | 8/2012 | Giese et al. | |
| 8,315,944 | B2* | 11/2012 | Driemeyer | G06Q 10/10 705/35 |
| 8,335,743 | B2* | 12/2012 | Monteverde | G06Q 40/04 705/26.1 |
| 8,694,479 | B1* | 4/2014 | Heyworth | H04L 67/06 707/705 |
| 8,751,793 | B2* | 6/2014 | Ginter | G07F 9/026 713/156 |
| 8,758,119 | B1* | 6/2014 | Bronstein Bendayan | H04W 4/21 463/25 |
| 8,798,777 | B2* | 8/2014 | Mundy | G06F 16/639 700/94 |
| 8,812,600 | B1* | 8/2014 | McGuirk | H04L 51/046 705/14.12 |
| 8,874,782 | B2* | 10/2014 | Lobsenz | G06Q 10/06 709/235 |
| 8,986,123 | B2* | 3/2015 | Satake | H04L 29/06034 463/42 |
| 8,992,228 | B2* | 3/2015 | Kostoff | G06Q 30/0269 434/238 |
| 9,032,022 | B1* | 5/2015 | Dunn | H04L 47/2433 709/203 |
| 9,047,736 | B2* | 6/2015 | Lempel | G07F 17/3281 |
| 9,137,273 | B2* | 9/2015 | Hoffman | H04L 65/403 |
| 9,183,543 | B2* | 11/2015 | Huynh | G06Q 10/107 |
| 9,345,974 | B1* | 5/2016 | Santini | G07F 17/3244 |
| 10,099,115 | B2 | 10/2018 | Butler | |
| 2002/0112163 | A1* | 8/2002 | Ireton | H04L 9/3236 713/176 |
| 2003/0036425 | A1 | 2/2003 | Kaminkow et al. | |
| 2003/0110130 | A1* | 6/2003 | Pelletier | G06Q 30/02 705/50 |
| 2005/0254371 | A1* | 11/2005 | Wirtz | G11B 20/00086 369/47.12 |
| 2006/0218651 | A1* | 9/2006 | Ginter | G06F 21/00 726/27 |
| 2006/0234795 | A1* | 10/2006 | Dhunjishaw | G06Q 10/06 463/42 |
| 2007/0033408 | A1* | 2/2007 | Morten | H04L 63/1408 713/176 |
| 2007/0087799 | A1* | 4/2007 | Van Luchene | A63F 13/792 463/1 |
| 2007/0124216 | A1* | 5/2007 | Lucas | G06Q 10/087 705/26.1 |
| 2007/0203841 | A1* | 8/2007 | Maes | H04L 63/08 705/52 |
| 2007/0208751 | A1* | 9/2007 | Cowan | G06Q 10/10 |
| 2008/0004093 | A1 | 1/2008 | Van Luchene | |
| 2008/0114836 | A1* | 5/2008 | Zellner | G06Q 30/06 709/206 |
| 2008/0300933 | A1* | 12/2008 | Britton | G06Q 10/06 705/30 |
| 2009/0017886 | A1* | 1/2009 | McGucken | A63F 13/005 463/1 |
| 2009/0106847 | A1* | 4/2009 | Krupman | G06F 21/10 726/26 |
| 2009/0157491 | A1* | 6/2009 | Brougher | G06Q 30/02 705/59 |
| 2009/0196465 | A1* | 8/2009 | Menon | G06F 21/10 382/118 |
| 2009/0327981 | A1 | 12/2009 | Nakamura et al. | |
| 2010/0005424 | A1* | 1/2010 | Sundaresan | G06F 3/04815 715/849 |
| 2010/0114664 | A1* | 5/2010 | Jobin | G06Q 10/06 705/7.29 |
| 2010/0121729 | A1* | 5/2010 | Betzler | A63F 13/12 705/26.1 |
| 2010/0299266 | A1* | 11/2010 | Catania | G06Q 20/3829 705/71 |
| 2011/0066908 | A1* | 3/2011 | Bartz | G06F 11/0709 714/746 |
| 2011/0119127 | A1* | 5/2011 | Hangartner | G06Q 30/02 705/14.46 |
| 2011/0145137 | A1* | 6/2011 | Driemeyer | G06Q 10/10 705/39 |
| 2011/0191417 | A1* | 8/2011 | Rathod | G06Q 30/02 709/204 |
| 2011/0212762 | A1* | 9/2011 | Ocko | G06Q 10/10 463/25 |
| 2011/0300929 | A1 | 12/2011 | Tardif et al. | |
| 2012/0015715 | A1* | 1/2012 | Luxton | G07F 17/32 463/25 |
| 2012/0084127 | A1* | 4/2012 | Nkrumah | G06Q 30/0213 705/14.15 |
| 2012/0124637 | A1* | 5/2012 | Dunaway | G06F 21/00 726/1 |
| 2012/0130853 | A1* | 5/2012 | Petri | G06Q 30/0609 705/26.35 |
| 2013/0097047 | A1* | 4/2013 | Kim | G07F 17/3244 705/26.4 |
| 2013/0103548 | A1* | 4/2013 | Venugopal | G06Q 30/0601 705/26.44 |
| 2013/0166332 | A1* | 6/2013 | Hammad | G06Q 40/10 705/5 |
| 2013/0179761 | A1* | 7/2013 | Cho | G06F 17/2235 715/202 |
| 2014/0024457 | A1 | 1/2014 | Justice et al. | |
| 2014/0025473 | A1* | 1/2014 | Cohen | G06Q 30/0207 705/14.28 |
| 2014/0200084 | A1 | 7/2014 | Butler | |
| 2014/0329585 | A1* | 11/2014 | Santini | G07F 17/3244 463/25 |
| 2015/0262152 | A1* | 9/2015 | Muller | G06Q 20/04 705/51 |

FOREIGN PATENT DOCUMENTS

| | | |
|---|---|---|
| CN | 102160080 A | 8/2011 |
| CN | 102184181 A | 9/2011 |
| CN | 102200988 A | 9/2011 |
| CN | 102576287 A | 7/2012 |

(56) References Cited

FOREIGN PATENT DOCUMENTS

CN      108295473 A    7/2018
EP       1296241 A2    3/2003

OTHER PUBLICATIONS

"Digital Ownership: From Content Consumers to Owners and Traders"; Michael Stini, Martin Mauve and Frank H.P. Fitzek; (Year: 2006).*
Rift Crafting and Gathering—Professions!—TGN.TV Uploaded Feb. 6, 2011. Posted by tgnRift http://www.youtube.com/watch?v=tlvl9QYAuMnt4.
U.S. Appl. No. 14/094,406 Office Action dated Sep. 17, 2015.
U.S. Appl. No. 14/094,406 Final Office Action dated May 25, 2016.
Overmars, Mark; "Designing Games with Game Maker", published Apr. 2, 2006, 289 pages.
Overmars, Mark; "Learning Object-Oriented Design by Creating Games1", published Dec. 2004-Jan. 2005, 7 pages.
Chinese Patent Application No. 201310656298.7 Third Office Action dated Aug. 21, 2017.
Chinese Patent Application No. 201810091411.4 First Office Action dated Jul. 1, 2020.
Chinese Patent Application No. 201810091411.4 Search Report dated Jul. 1, 2020.
U.S. Appl. No. 14/094,406 Office Action dated Jun. 14, 2017.

* cited by examiner

SYSTEM AND METHOD FOR SHARING DIGITAL OBJECTS

CROSS-REFERENCE TO RELATED APPLICATIONS

This application claims benefit of priority of U.S. Provisional Patent Applications Ser. Nos. 61/734,305, entitled "PERSISTENCE AND CONSEQUENCES"; 61/734,298, entitled "SHARING DIGITAL OBJECTS"; and 61/734,290, entitled "USER CREATION OF DIGITAL OBJECTS", all of which were filed Dec. 6, 2012, are owned by the assignee of the present application, and are herein incorporated by reference in their entireties.

FIELD OF THE INVENTION

This invention is in the field of digital simulations or online environments, and more particularly in the field of sharing digital objects within such simulations or environments.

BACKGROUND

Building and sharing objects are popular and entertaining in games and simulations, as in real life. One way of building objects in video games is crafting. Objects may also be obtained by trading with other players (or more accurately, to other player characters), e.g., by barter or a currency transaction, where the currency is in-game or real. Players can perform such functions "manually", or marketplaces have been created where such may occur (such as Station Exchange® or auction houses).

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Implementations of systems and methods according to present principles provide new ways to share digital objects in computing environments, improving the user experience and also enhancing communication and relationships among people. The "sharings" can occur as a transfer of an object from one user to another or the transfer of the object into an environment (or vice versa). In one example, a user in a game designs and builds a digital object for a tower and then sells the tower in the game. The tower becomes popular and is used by many other players of the game, including as a part of their own constructions, and also begins to appear in system-generated structures. The creator of the original tower, as well as creators of components constituting the tower, may be provided with compensation for their efforts from such sales of subsequent towers or constructions using such towers.

To accomplish the above, in one implementation, an object-tracking system is employed which keeps track of objects as they are sold, and in particular maintains information about the creators or crafters of components and subcomponents constituting an object (known from, e.g., the data structures and methods from U.S. Provisional Patent Application Ser. No. 61/734,290, entitled "USER CREATION OF DIGITAL OBJECTS" noted above) to provide compensation and recognition to such crafters. Calculations for such compensation and recognition may be "subjective" such as via contract, or "objective" based on a system-calculable measure, such as a percentage of volume or surface area (visible or total) constituting a builder's contribution. Another such objective measure may be voxel count, where a "voxel" is a basic building block used in some online environment building schemes, including those described in U.S. Patent Applications Ser. Nos. 61/734,290, entitled "USER CREATION OF DIGITAL OBJECTS", and 61/734,287, entitled "BUILDING DIGITAL OBJECTS WITH BLOCKS". Voxels may have arbitrary shapes, although in many implementations they are represented by rectangular solids or cubes. Other objective calculations will be seen, such as based on "visible" voxels (those voxels visible to a user of the game), complexity, e.g., to compensate especially complicated or artful structures, total time required for construction, and the like. The attribution may likewise allow non-financial recognition of such creators and creative inputs, e.g., via badges or achievements or the like.

Variations abound and will be seen. For example, a copy detection tool can be employed to prevent copying and the subsequent undesirable reduction of value of created objects Minimum pricing may also be used for this purpose. Visibility of objects within the game environment may be based on the relationship of the viewer to the object owner. And while the disclosed systems and methods are primarily in the field of user-created objects in multiplayer video games, the same may be expanded to any digital objects in any environment.

Systems and methods according to present principles may also include an object-influence tool which can work with the object-tracking system (or which can work independently). For objects or components that are oft-used, e.g. oft-purchased (either the object or a template for the object, explained in greater detail below), or which have significant popularity (e.g., many "likes" in implementations where users can indicate their affinity or appreciation for a product in that way), such objects may be propagated by the system without creator input but rather by the system so as to recognize the creator's contributions, and in some implementations to give the creator recognition. For example, a finely-crafted armor set may influence armor worn by the city guard. Particular colors for objects may also be propagated in this way, along with numerous other game aspects. In one aspect of object influence, the invention is directed towards a method of propagating digital items such as objects or templates in an online simulation, including: determining the popularity of a set of digital items; for digital items having a popularity greater than a threshold, making at least one object related to the digital item and distributing the related object at another location in the online environment. Implementations may include one or more of the following. The threshold can be a certain number or may be the top few entries of popular items in a list, as well as calculated in other ways. The popularity may be based on a number of "likes" associated with the digital object or template, or based on a number of transfers of rights of the digital object or template. The related object may be a copy of the digital object. The digital item may be constituted of a number of components, and the popularity may be based on a number of transfers of rights of one of the components (in either object or template form) or on a number of "likes" of one of the components. In another aspect, the invention is directed towards a non-transitory computer-readable medium, comprising instructions for causing a computing environment to perform the above method for object influence.

Systems and methods according to present principles may also include techniques for managing the effects of user actions and their impact on a computer environment. In one implementation, a computer system provides structures and interfaces to manage an environment, such as in a multi-player game or simulation. In an online game environment, player actions to build, change or destroy objects may be enabled to have lasting effects both in the environment itself and in the later actions of non-player characters (e.g., in story development). In one such aspect, the invention is directed towards a method for managing an online environment, including: receiving an instruction to perform an action by a character in an online environment operated by a computer system; performing the action in the online environment; storing an effect of the action as a persistent act; associating the stored persistent act with the character; accessing the stored persistent act when the character interacts with another character in the online environment; and selecting a response for the other character based at least in part on the stored persistent act information. In an implementation, the invention may include the further steps of storing a social network of relationships for the other character, where the social network indicates whether the other character has interacted with other entities or not; searching the social network for the character; and selecting a response for the other character based on the search of the social network.

In one aspect, the invention is directed towards a method of tracking and benefiting sources of components in transferred rights to digital items in an online simulation, including: on a server, receiving notification of a transfer of a right to a digital item, the digital item constituted of a plurality of components, at least two of the components associated with different respective sources; and upon the transfer, providing a benefit to the different respective sources.

Implementations of the invention may include one or more of the following. The transfer of the right may be in exchange for a compensation, and the providing a benefit to the different respective sources may include transferring at least a portion of the compensation to the different respective sources. The transferring at least a portion of the compensation to the different respective sources may include: receiving the compensation from a buyer and associating the compensation with a server account; receiving a token indicating the right to be transferred; transferring the token to the buyer; and providing at least a portion of the compensation to the different respective sources. The portion of the compensation may be apportioned to the respective sources on an objective basis. The objective basis may be based on proportionality with the size of the component associated with the source. The size may be related to, with respect to a component, a surface area, a volume, a visible surface area, a visible volume, a voxel count, a visible voxel count, or a time for construction. The objective basis may also be based on proportionality with the value of the component associated with the source. The method may further include receiving a schedule from a seller, a buyer, the server, or one of the sources, and apportioning at least a portion of the compensation according to the schedule. Upon a subsequent transfer of the right, the compensation for the subsequent transfer may be apportioned at least in part according to the schedule. The transferring may include debiting a buyer account and crediting a seller account, the buyer and seller accounts associated with player characters in the online simulation. The benefit may be a recognition benefit, such as a badge or an achievement. The transferred right may be represented by a resultant object or a claim. At least one of the components may be made of at least two subcomponents, each sub component associated with a respective source, and the providing a benefit to the respective sources may include providing a benefit to the sources of the two subcomponents. The method may further include comparing the digital item to a registry of digital items and detecting if the digital item is substantially a copy of a digital item in the registry. If the digital item is substantially a copy of a digital item in the registry, then the transfer of rights may be prohibited.

In another aspect, the invention is directed towards a non-transitory computer-readable medium, including instructions for causing a computing environment to perform the above method.

In yet another aspect, the invention is directed towards a method for sharing digital items, including: creating a first digital item based on instructions from a first user; transferring a first payment from a second user to the first user; granting the second user access to a copy of the first digital item; creating a second digital item based on instructions from the second user, where the second digital item includes a copy of the first digital item; transferring part of a second payment from a third user to the second user; transferring part of the second payment from the third user to the first user; and granting the third user access to a copy of the second digital item.

Advantages of the invention may include one or more of the following. Object tracking and attribution allows crafters of components constituting a digital object or template to share in revenue and recognition upon the sale of the digital object or template (along with the seller of the object or template). Other advantages will be apparent from the description which follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Corresponding reference characters indicate corresponding parts throughout the drawings. Elements are not drawn to scale unless otherwise indicated.

DETAILED DESCRIPTION

Figure 1:
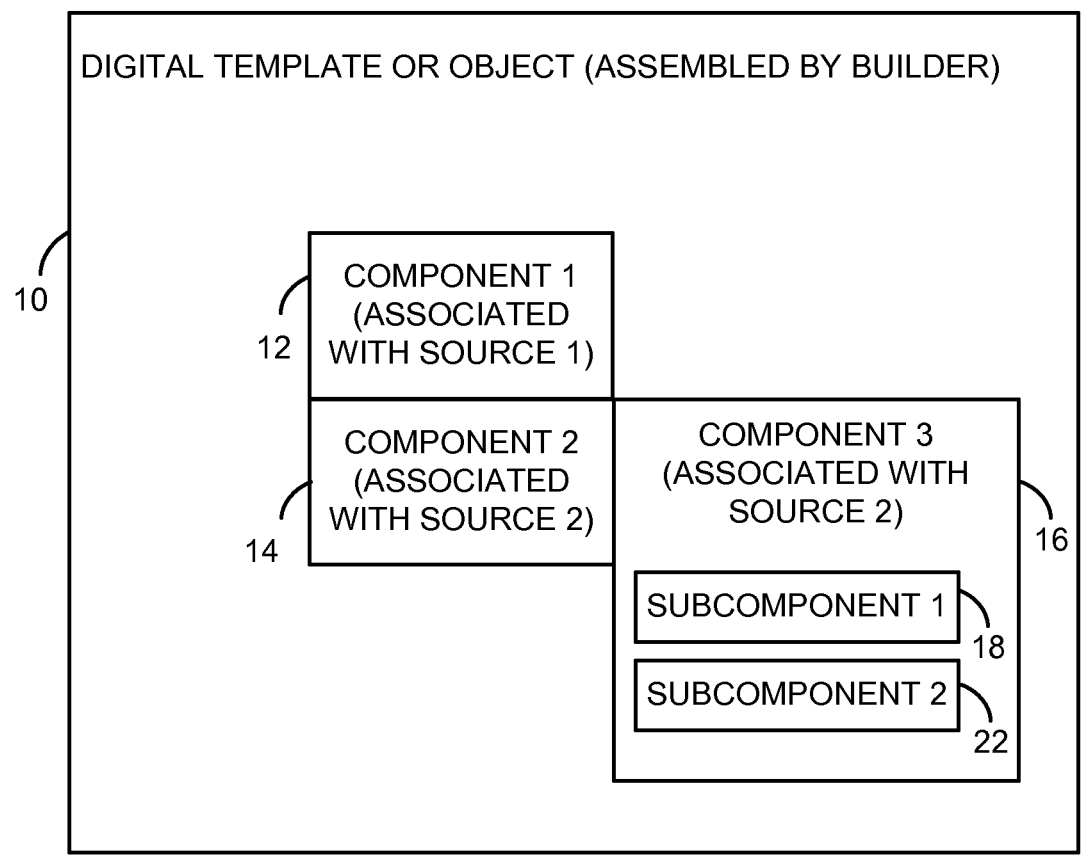
FIG. 1 is a schematic diagram of a digital template or object, including a number of components and subcomponents, which may be transacted using systems and methods according to present principles.

In this specification, certain terms are used, and such terms are defined below. Referring to FIG. 1, a template or object 10 is illustrated which includes a number of components 12-16. These components are associated with respective sources (shown in FIG. 2). The component 3 (element 16) has two subcomponents 18 and 22 shown. The subcomponents may themselves include sub-subcomponents. Each component, subcomponent, sub-subcomponent, and so on, or indeed the entire assembly, may be made by different individuals or groups of individuals. Similarly, one individual may make more than one of the components or subcomponents.

More specifically, a "template" is a recipe, blueprint, schematic, or other data object which includes information about the components that make up a computer-generated or digital object (including subcomponents and sub-subcomponents and so on), and may further include information about how the components are put together to make up the object, i.e., what steps or skills are required in its construction. The template further includes information about the sources of components and subcomponents, which are in many cases the creators of those components. The system thus maintains the identities of those who have created the components in the various ways, e.g., by crafting, collecting, mining, harvesting, or other means. Having a template allows a player to re-create the digital object, termed occasionally a "resultant object", although the player must still accumulate the various components and/or materials listed in the template, e.g., by purchasing or making them. In some cases, a user is also required to accumulate skills necessary to put certain components together, or to create components or subcomponents, or a user must work with other users to put the components together. Typically users will create and sell templates rather than the resultant objects, as a template may be used to make many resultant objects.

In creating a template or an object, components or other building blocks may be employed, and these components or building blocks may be arbitrary. For example, in creating a sword, constituent components or building blocks may include a hilt and a blade. Subcomponents may form constituent building blocks of components. For example, the subcomponents of a hilt may include a guard, a grip, and a pommel. In more general types of constructions, rather than specific object parts, components or building blocks may be rectangular solids formed of various types of materials, and which may be placed together in any arbitrary fashion. From such, a user may construct a stone wall, metal armor, or the like. Certain aspects of construction using such building blocks are described in the co-pending US patent applications incorporated by reference above.

A "claim" is a piece of property in an online environment on which a resultant object is built or placed. In many cases resultant objects placed on claims are immovable, but in other cases such may be relocated to another location in the online environment, e.g., onto another claim. In some implementations, claims may be bought and sold, including objects or templates located on the claim. However, if the seller did not take part in the construction of the template or object on the claim, in some implementations the seller will receive no remuneration or compensation from the sale of the same, e.g., as no constituent components are associated with the seller, in the sense of the seller having expended effort to create such.

While in many cases this specification contemplates the sale of a template from one user to another, i.e., from a seller to a buyer, it will be understood that the system and method may apply to any "transfer of a right" (or similar terminology) for a digital object or template, e.g., a sale, a license, a rental, a use right for using a component in an assembly, a right to sell an assembly using a purchased component (either in object form or template form), and the like. Of course, in any given implementation, such rights may be amended, abbreviated, expanded, etc. The transfer is generally in return for a "benefit", and the benefit may be a form of compensation, recognition (from the controller of the online environment or from the buyer) to the creators and sources involved. In the case of recognition, the same is termed a "recognition benefit" and may provide the recipient with a badge, an achievement, points in a game many other benefits.

Other Definitions are Within the Body of the Specification.

Generally, in one implementation, a computer system provides structures and interfaces to share digital templates or objects, such as in a game or simulation. Sharing can include transferring a digital item such as a template or object from one user to another, e.g., by adding a copy of the digital representation of the item to the receiving user's account or profile, or by granting access to the receiving user. For example, player A can give a sword to player B. Sharing can also include selling or trading an item to another player as part of an exchange, such as for money (in-game currency or real), another item, a service, etc. For example, player A can sell a book to player B for five dollars. Sharing can also include granting access to an item to another player, such as for viewing or use. For example, player A can allow player B to view player A's house and furnishings. The sharing can be controlled by the game. For example, transfers can be restricted to only ones approved by the owner, e.g., a sale, or made freely available, with compensation or benefits akin to a mechanical license. In one example, a player can select any object, or an object that is within a set of defined types of objects, and make a copy of the object at will.

The templates or objects can be created by players or provided by the game environment. Game items can include usable items, such as clothing, equipment, weapons, vehicles, furniture, structures (e.g., houses, shops, or other buildings). Game items can include active game entities, such as people, animals, monsters, insects, etc. Game items can also include logic or preferences defining behavior patterns or operating characteristics indicating how an object will act or respond, such as the behavior of a guard, dragon, or trap door. Game items may also include item components, such as textures, colors, text, audio, music, video, animations. Game items can include environments, which may in turn include other game items, such as dungeons, cities, shops, public transportation, dynamic events, or minigames. For example, a game item could be a castle including multiple structures, furniture, people, guards, animals, and an assortment of food such as fruit and cheese. Not all item types will necessarily be supported by in game tools in all implementations. In one implementation, the objects can be created using an implementation of the patent applications incorporated by reference above.

Figure 2:
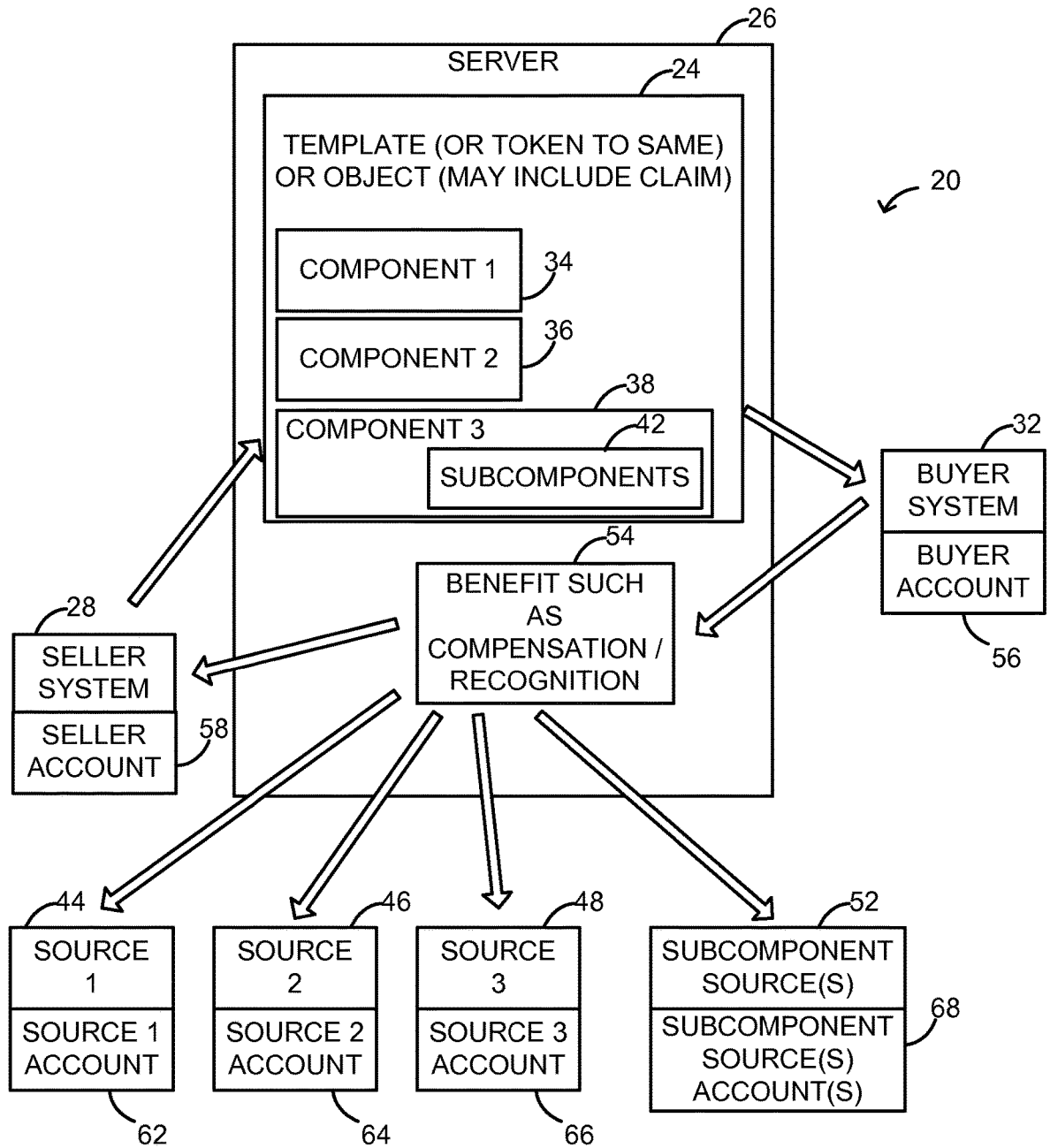
FIG. 2 is a logical diagram of elements in a system performing a transaction of rights to a digital object or template, including a buyer system, a seller system, a server, and various sources of components and subcomponents.

In one implementation, and referring to FIG. 2, the computer system includes an item tracking system 20, i.e., for objects and/or templates. The item tracking system 20 generally runs on a server 26 but modules of the same may optionally run on one or more client systems. The system 20 keeps track of the origin of items and (including component parts) the use of items in the game and in other objects or templates. The item tracking system 20 can manage attribution so that users can see who created an object (a specific object or the original template from which a copy was made), or the components of an object, shown in FIG. 2 as first, second, and third components 34-38 of the template or object 24. The third component 38 includes one or more subcomponents 42. The item tracking system 20 keeps tracks of the makers or creators of such components and subcomponents, illustrated in FIG. 2 as sources 44-52.

The item tracking system 20 can also track the use, sale, or other transfer of rights relating to the template or object 24 from a seller 28 to a buyer 32 and the contribution of components to sold objects. This tracking is useful to provide benefits 54 back to the sources 44-52, i.e., the creators and contributors, which benefits may be in the form of compensation or recognition, e.g., points, reputation, prizes and the like. In the case of compensation, the amount paid by a buyer is debited from a buyer account 56 and is credited in part to a seller account 58 as well as to accounts 62-68 associated with the sources 44-52, respectively. In an exemplary implementation, where copies of certain objects can be freely or cheaply made, each copy may grant reputation or popularity points to the object creator (or creators in proportion to their contribution).

In a template or object marketplace, each sale of an item may provide a payment back to the creators of the item. For example, player A may create a wood texture and put the texture up for sale in the marketplace. Player B buys the wood texture, makes a door using the texture, and adds the door to the marketplace. Player C buys the wood texture, makes a drawbridge, and adds the drawbridge to the marketplace. Player D buys 4 doors from player B and the drawbridge from player C and then builds a castle using the doors and drawbridge. When player D sells the castle to player E, portions of that sale price go back to each of players A, B, C, and D based on their items' contribution to the castle. In one implementation, an automated system is used to determine the percentage contribution (e.g., based on relative size when rendered). In another implementation, sellers can place royalty rates on their objects when they place the objects in the marketplace. The benefit scheme can be based on a number of other factors as described below in connection with FIGS. 5-7.

Figure 3:
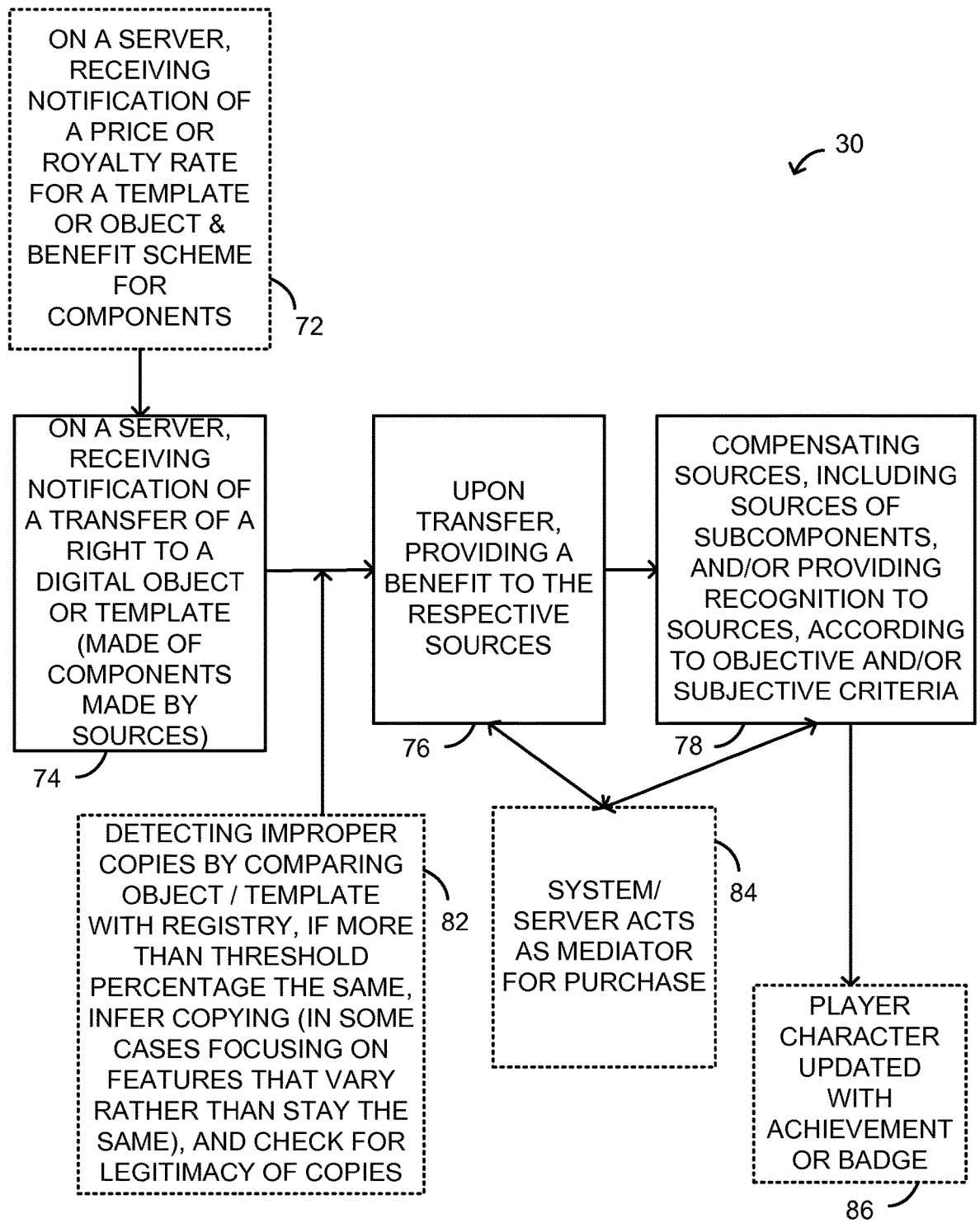
FIG. 3 is a flowchart according to one implementation of present principles.

A general method according to present principles is illustrated by the flowchart 30 of FIG. 3. Prior to the main steps of a sale or other transfer of rights to an object or template, a server receives a notification or other information about a price of an object or template as well as a benefit scheme for the components and/or subcomponents thereof (step 72). The price may be an amount certain, a royalty rate, or other desired consideration. The notification or information can be in a number of forms as required or desired by a seller owning the right to the template or object.

In a next step, the server receives notification of a requested transfer of a right to the digital object or template (step 74). For example, a seller may post an item for sale and a buyer may respond to the post. A buyer may also commission an item from a seller who is a known, esteemed, or otherwise reputable craftsman. Numerous variations of this step will be understood.

The transfer and transaction may occur in a number of known ways. For example, the buyer may receive a copy of the template or object, with the seller's rights to the same either being maintained or extinguished. For example, where a seller is transferring a right to a template, the seller may generally maintain rights to sell the template again. Where a seller is transferring an object, the system and method may either allow the seller to transfer another copy of the object or may require the seller to construct the object again, e.g., from a template, prior to another transfer. Variations will be seen, e.g., the seller need not necessarily construct another digital object from a template but may be required to pay a transaction cost to create another copy of the object.

A benefit is then provided to the respective sources (step 76). In more detail, remuneration or compensation may then flow from the buyer to the seller and/or the various sources (step 78). The remuneration or compensation may be calculated in any number of ways, as described in greater detail below, such as based on voxel count, "visible" voxels (those voxels visible to a user of the game), surface area, volume, complexity, time for construction, and the like. Compensation may also be based on a scheme agreed to by the users.

Even where an object or template is not sold for value, e.g., is given away for free, recognition or like benefits may flow to the seller and sources of components. Such recognition benefits may be out-of-game or in-game, e.g., such recipients of recognition may have player characters, associated with the sold object or template, receive recognitions such as achievements or badges (step 86). In some cases, the system or server may act as a mediator for the purchase (step 84), such that the template or object is first sold to the server and then sold again from the server to the buyer.

During a sale, a step may be performed of detecting an improper copy (step 82). In more detail, as a template or object is about to be sold, the same may be compared with a registry of digital templates or objects within the game, to determine similarity with such items. If the similarity is greater than some threshold percentage, copying may be inferred. In such similarity analysis, particular focus may be on features that vary, i.e., complex features, rather than on features that do not have significant spatial variation, e.g., walls or foundations. If an object or template is found with substantial similarity, especially in complex features, then a check may be made as to whether the seller of the subject item is the same as the seller noted in the registry, or if the seller of the subject item was a legitimate transferee of rights. If so, the transfer may be allowed, while if not, the transfer may be prohibited. Additional details of such copy detection systems and methods are described below in connection with FIG. 8.

Figure 4:
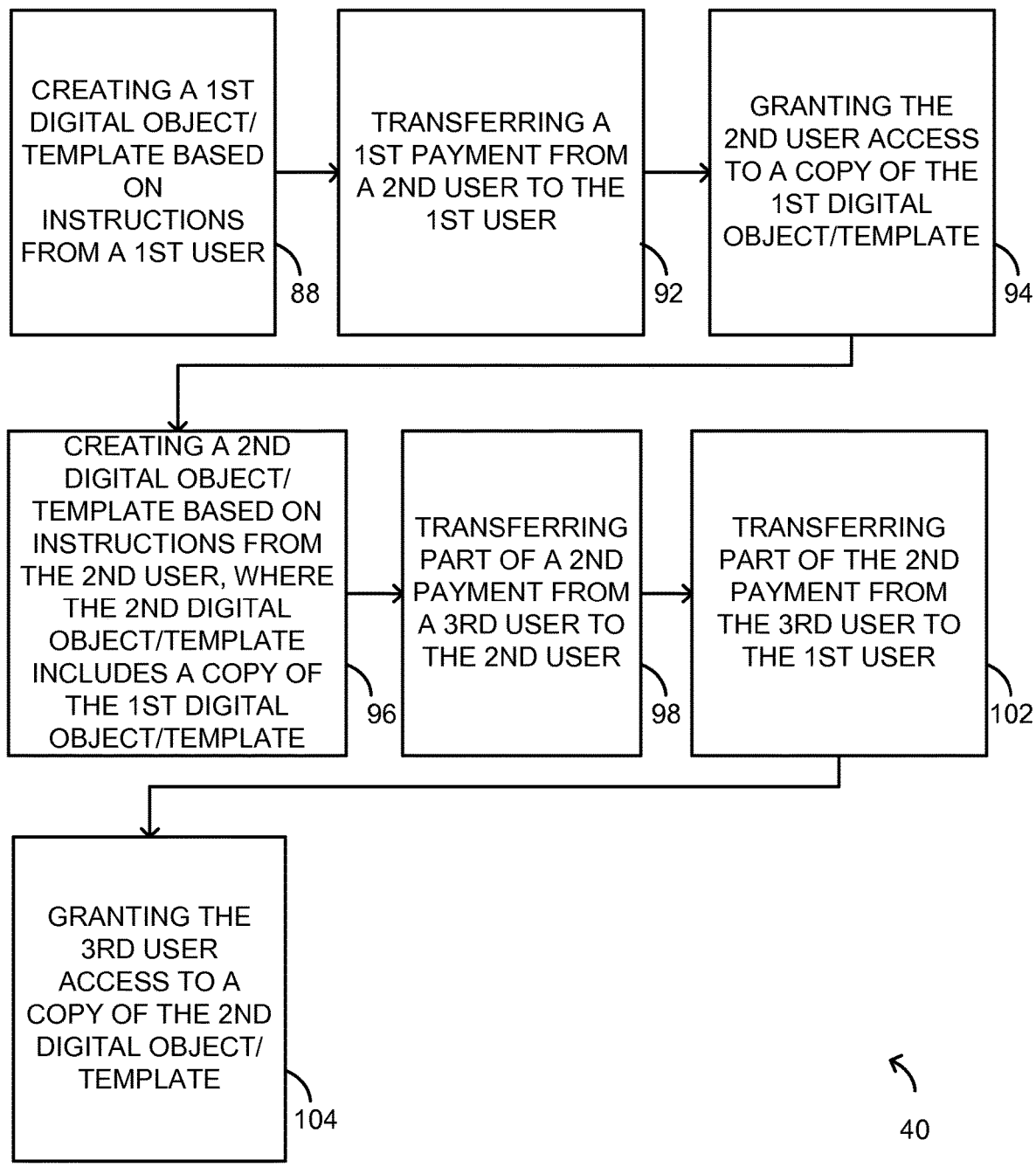
FIG. 4 is a flowchart according to another implementation of present principles.

FIG. 4 is a flowchart 40 illustrating a specific implementation of a method according to present principles. In a first step, a first digital object or template is created based on instructions from a first user (step 88). This creation step may be accomplished in various ways, as are described above and in the patent applications incorporated by reference. In a second step, a transaction occurs; payment is transferred from a second user to the first user (step 92), and in return for such payment, the second user is granted access to a copy of the first digital object or template (step 94).

A second digital object or template is then created based on instructions from the second user, where the second digital object or template includes a copy of the first digital object or template (step 96). In other words, and in one example, a second digital template is made that includes the first digital template, e.g., a castle is made by the second user that includes a wall purchased from the first user. A third user then desires to purchase the second digital object or template. In so doing, a second payment is made, from the third user to the second user (step 98). Part of the second payment, from the third user, is then transferred to the first user (step 102). In other words, the third user not only pays the second user but also pays a component builder of the second digital template or object, not just the final assembler of the same. The third user is then granted access to a copy of the second digital object or template (step 104).

Figure 5:
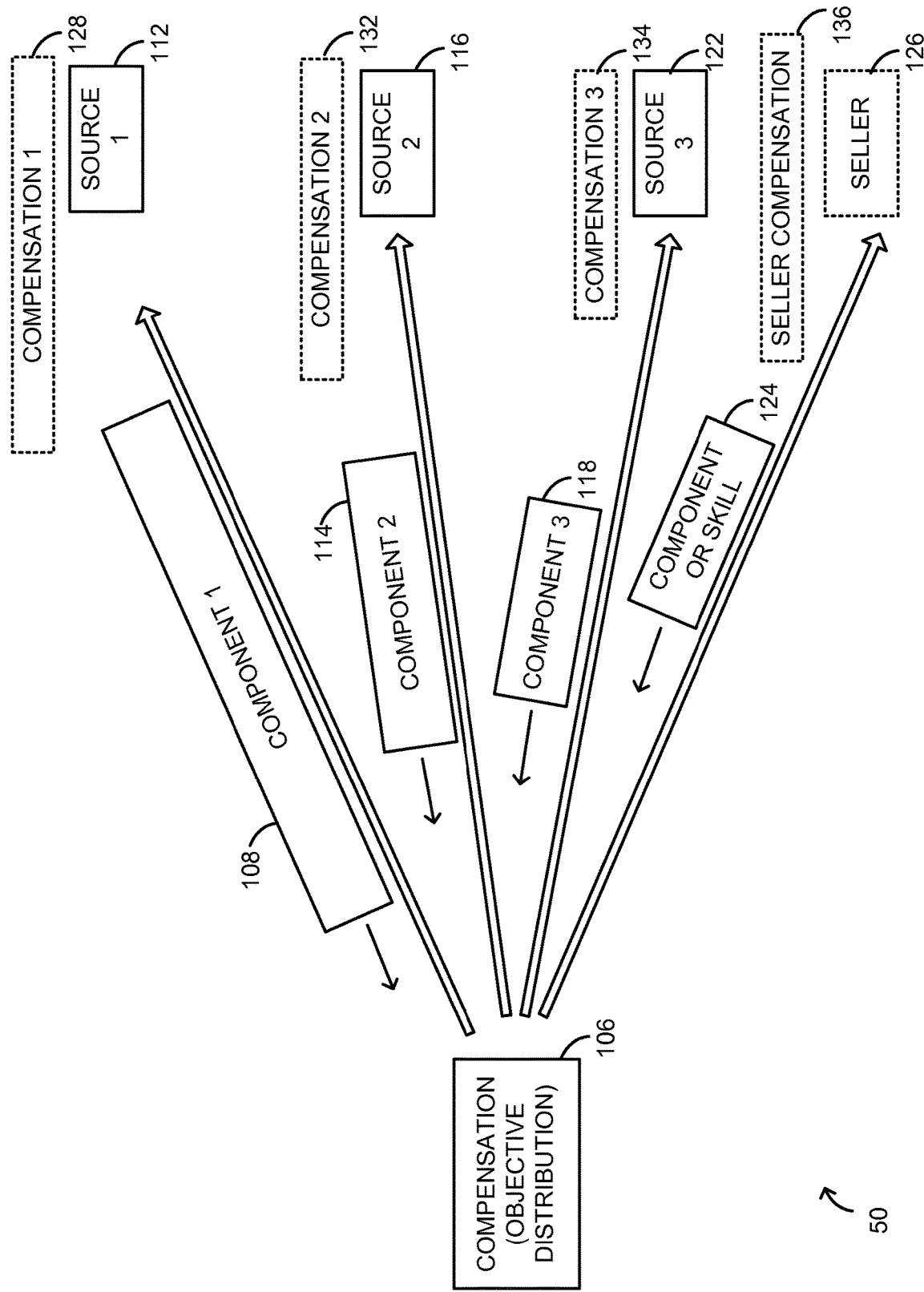
FIG. 5 is an illustration of compensation flowing to sources based on an objective distribution.

FIG. 5 is a chart 50 illustrating a compensation scheme having an objective distribution. In the chart, a first component 108 is associated with a first source 112, a second component 114 is associated with a second source 116, a third component 118 is associated with a third source 122, and optionally another component (or skill) 124 is associated with a seller 126. The first component is illustrated as larger than the second component, which is in turn larger than the third component, to indicate that in some objective fashion the first component warrants more compensation than the second, which in turn warrants more than the third. For example, the complexity of the first component may be greater than that of the second. The number of voxels in the first may be greater than the number in the second, or the number of visible voxels may be greater, or some other object of measure indicates that the value of the first is greater than the value of the second. In another objective fashion, but directly not related to physical properties, the value of the first component may be greater than that of the second as judged by, e.g., a marketplace such as an auction house or other source. Numerous other ways of valuing components will be apparent given this disclosure.

As the first component 108 warrants more compensation than the second, and the second more than the third, the respective compensations have been similarly sized, at least qualitatively. That is, the first compensation 128 for component 108 is greater than the second compensation 132 warranted for the second component 114, and so on for the third compensation 134 and the seller compensation.

In one implementation, if the seller 126 contributed no voxels, nor exerted any building efforts or skills towards completion of the digital template or object, the same may not be due any compensation at all. However, in many other implementations, the seller will have assembled various components, or may use some skills to do so, and so in return for such compensation or skills 124 the seller 126 warrants a compensation 136. In other variations, the act of assembling the components and subcomponents together may warrant compensation to the seller. In yet another variation, the collecting or compiling of the components and other necessary materials, including payment for the same, warrants compensation to the seller.

Figure 6:
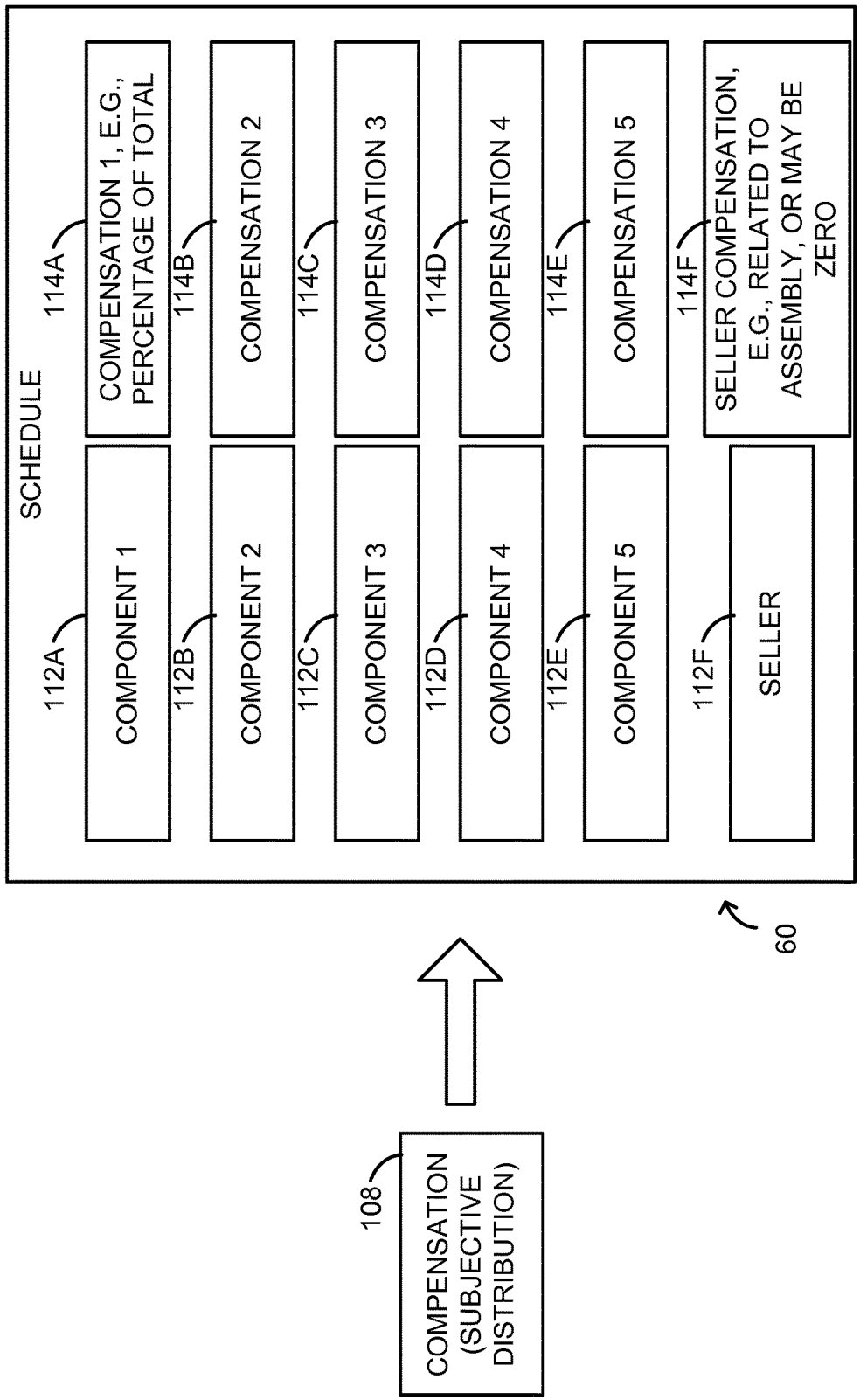
FIG. 6 is a schedule of compensation flowing to different sources, based on a subjective distribution, such as when parties determine apportionment of compensation by contract.

FIG. 6 is a chart illustrating a compensation scheme having a subjective distribution for compensation 108. In this case, various sources, builders, and assemblers simply agree "by contract" what each is entitled to in return for the rights to their digital template or object (or other material, such as constituent building materials). For example, a crafter may create a door that is very popular, i.e., may create a template for such a door. Builders or other assemblers may wish to purchase the template for the door for use in their own creations. They may agree to pay the original craftsman of the door a set percentage royalty or an amount certain per door. Such are illustrated in the schedule 60. In the schedule 60, first through fifth components 112A-112E are illustrated with corresponding compensation values 114A-114E. Again, these may be set values, percentages, formulas, recognition benefits, combinations of compensation and recognition benefits, or any number of other such schemes of varying degrees of complexity. The schedule 60 also shows a compensation 114F due to a seller 112F, which as noted may be due to seller building efforts, seller work in assembling components, seller collection of components and materials, or the like. Using such a schedule, upon a transaction, the item may be provided to the buyer and benefits may flow to the sources according to the scheme set forth.

Figure 7:
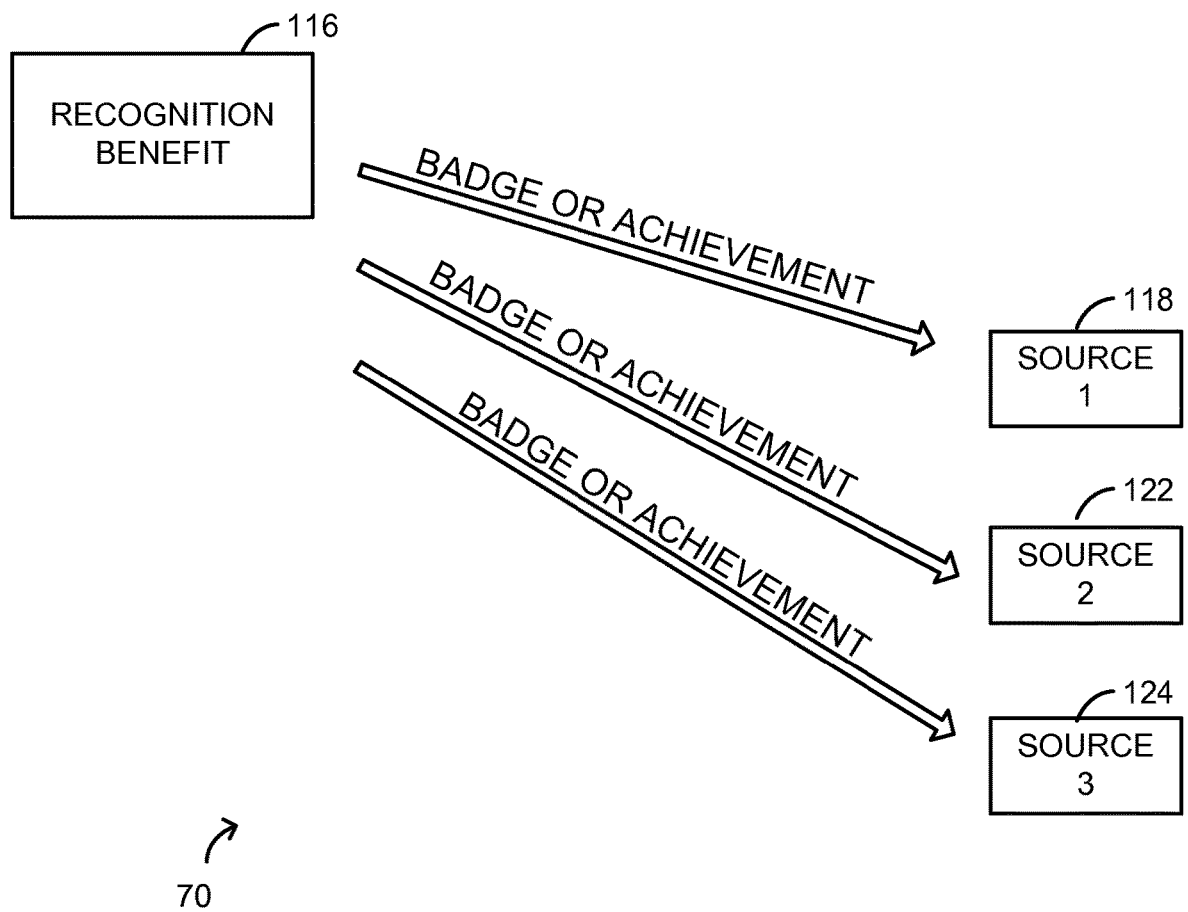
FIG. 7 is an illustration of recognition benefits flowing to sources.

FIG. 7 illustrates a chart 70 showing provision of recognition benefits 116 to various sources 118-124. The recognition benefits 116 may be in place of or in addition to compensation benefits, and may include badges, achievements, points, reputation, experience points, or any other sort of recognition. Recognition benefits may be provided to a player character who crafted the sold items in-game, e.g., by providing the same with badges or other paraphernalia with which to adorn the avatar of the player character, or by providing notifications such as achievements on a player character profile or other community-accessible board or site. Recognition benefits may also be provided to a player or user, by noting an achievement or other notification, e.g., "Master Builder", with their user name or user ID. Groups of player characters such as guilds may perform projects, with ensuing guild benefits, such as compensation and/or recognition.

Figure 8:
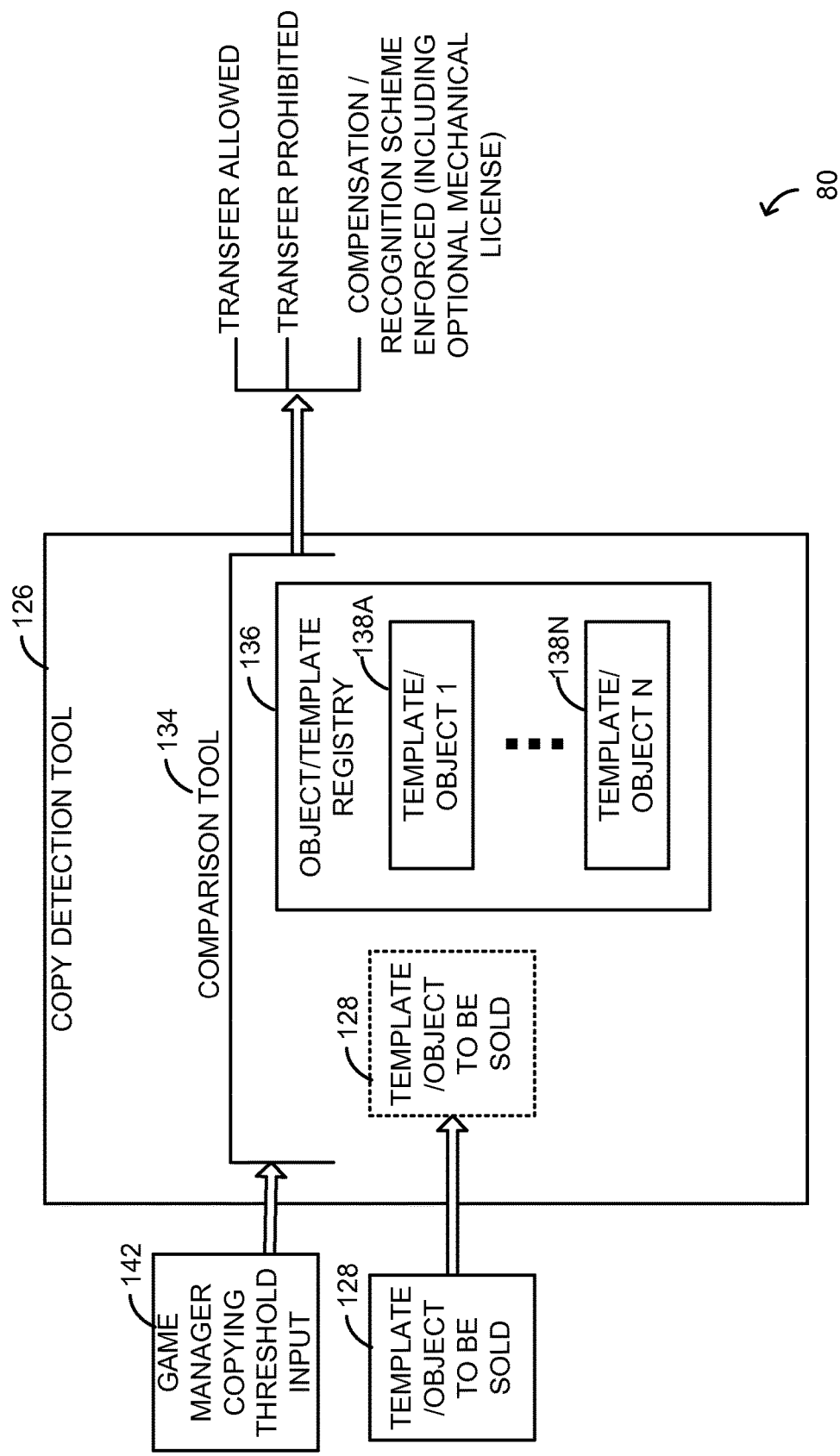
FIG. 8 illustrates a logical diagram of a copy detection tool which may be implemented in systems and methods according to present principles.

Referring to FIG. 8, and as noted above, the systems and methods according to present principles may include a copy detection tool, and the same is illustrated as a tool 126 in a copy detection system 80. The copy detection tool 126 receives a potential object or template 128 to which rights are to be transferred and compares the same against a number of objects 138A-138N in an object/template registry 136. Such comparison may be performed prior to any or all transfers. The copy detection tool evaluates a created template or object for similarities with existing items. Similarity analysis may be performed on an overall basis, on a component-by-component basis, or via a hybrid analysis (or via other techniques). Depending on the determined percentage of similarity, the copy detection tool may control the creation or use of the new object. The threshold for copying may be input by a game manager as a threshold 142, and the same may be expressed as a percentage of like voxels, like surface area, like volume, like "visible" aspects as noted above, and so on. Exemplary thresholds include 50%, 75%, 95%, 100%, and, e.g., values therebetween.

Depending on the results of the comparison, various actions may be taken. For example, if the object or template to be sold 128 does not meet the threshold for copying, transfers may be freely allowed. On the other hand, if the object or template 128 to be sold meets the threshold for copying, a transfer may be prohibited unless legitimacy is established by a proper trail of transfers to the current seller. In another implementation, if the object or template meets or exceeds the threshold for copying, a benefits scheme may be automatically enforced. For example, the system or user may set higher royalties or prices for unauthorized copying, or a mechanical license may be instituted to compensate the seller for the copying. In some implementations, copying may be prohibited for user-created templates or objects, but may be allowed for system-created items.

In any event, such enforcement of penalties for copying, or restrictions against copying, has the benefit and advantage of maintaining the values of items, which values would in many cases be vastly-reduced if unauthorized copying were unfettered.

In a specific implementation, the game may prevent a new object from being finalized or from being used, e.g., from having a template created therefrom, or sold, if the new object is more than 75% similar to another user-created object. This could be lifted if the original author provides permission. In another implementation, an automatic royalty could be applied or required when a threshold is met. For example, creating a new object that is a copy would require a royalty back to the original author for each percent above a threshold (e.g., with an 80% threshold, a 5% royalty is required for an 85% copy).

Figure 9:
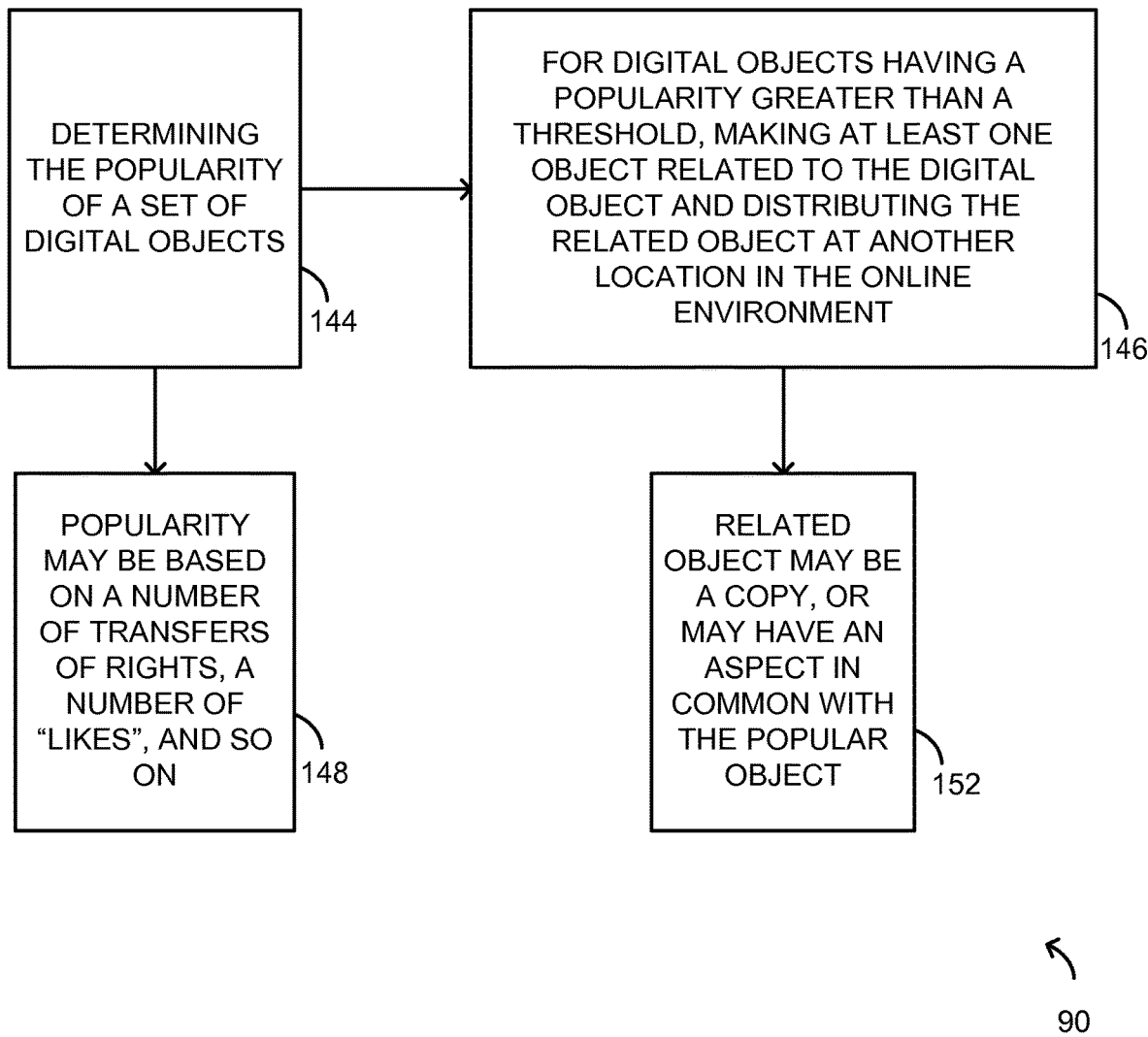
FIG. 9 is a flowchart according to another implementation of present principles, showing steps in a method for object influence.

In yet another implementation, and referring to the flowchart 90 of FIG. 9, systems and methods according to present principles may include an object influence tool. The object influence tool tracks the popularity of objects and causes particularly-popular objects to spread in the game environment. The tool performs a method including determining the popularity of a set of digital templates or objects (step 144). For particularly-popular items, i.e., those having popularity greater than a threshold, either a relative threshold or an absolute one, the system and method may cause such items to be automatically-propagated in the online environment, e.g., the system may make copies of such items and distribute the same at various locations in the environment. The popularity itself may be based on a number of factors (step 148), including the number of transfers of rights associated with the template or object. Where a "like" or other approval system is instituted, the popularity may be based on the number of "likes" or approvals. In some cases, the propagated item is one influenced by a popular item, or that has an aspect in common with the popular item (step 152), e.g., a particular style of texture, a particular color, and so on, rather than a direct copy.

As specific examples, a user creates a painting object and sells the object to another user. The buyer places the object in their housing. Other users see the painting and give it high ratings. In the marketplace, if copies of the painting object are for sale, the listing will indicate the item's popularity, and possibly where it can be viewed, i.e., who owns the painting object. As more users buy and place the object and more users rate it highly, the object becomes more popular. At a threshold point, the object influence tool will place and/or propagate the popular object in the game environment. For the painting object, the painting could be added as a painting on the wall of an inn. Visitors to the inn can then also rate the painting, further affecting its popularity. As the popularity grows, the object influence tool will place the object in additional game locations. For example, the object can appear in other areas players visit (city squares, castles, dungeons), stores, museums, and the like. Similar approaches can be used for any object—sculpture, clothing, weapons, armor, equipment, books, text, plays (written and performed), furniture, music, weapons, architecture, dance moves, monster behavior, weather effects, etc. The object influence tool collects ratings information for various objects based on user response, e.g., ratings for whether viewers like an object or behavior, or by analyzing use, e.g., sales or effectiveness of AI. In another example, the object influence tool and the game environment systems interact to determine profiles for online characters in regions such as towns, kingdoms, etc. The profiles can be used to determine whether a computer-controlled character or region would like an object. In this way, objects can become popular and spread through AI behavior and profiles as well as user ratings.

In another implementation, the object influence tool derives aspects or components of popular objects to create influences rather than direct copies. For example, if several items of very popular clothing are all a similar color, the color can become an influence. If a particular tower style is extremely popular, that tower or style can become an influence. To create an influence, the tool can extract one aspect from the popular object(s) and use it as the influence, e.g., a shape, pattern, color, etc. The object influence tool can then use those influences to adjust the game environment. For example, when blue is a popular influence, townspeople will wear more blue clothes. To facilitate this, components of objects can have dynamic attributes to adjust as influences change. For example, the types of swords carried by guards in a city may change over time as different styles become more popular and others fall out of fashion.

In another implementation, a user can place an object that is dynamic and adjusts based on user preferences and popular trends. For example, a user places a picture frame in their housing and the picture is updated daily to show the currently most-popular screenshot captured during a particular encounter or battle, e.g., instance, raid, PVP map, etc. Another example of a dynamic object is a magazine object, and such an object may include images or descriptions of popular objects, e.g., fashion magazines. Similarly, a radio object could play audio reflecting the most popular music.

In another implementation, the most popular objects may be used to create secondary merchandise for out-of-game use, e.g., t-shirts or posters with a very popular painting or sculpture, an e-book for a collection of popular jokes, downloadable music for popular music, or clothing or gear to replicate popular in-game clothing or equipment. Similarly, out-of-game media can be used to indicate popular in-game objects, such as social network services, e.g., Facebook™, Twitter™, email, and blogs.

In yet another implementation, user housing sharing is tracked with a housing management tool. User housing includes game spaces associated with a user or users and created and/or decorated with game objects and assets, e.g., colors, textures, audio, etc., by the user(s). As users share their housing with each other, allowing visits and views of their game housing, visitors and viewers can indicate their opinion, e.g., with a "like" button, a numerical score, or similar ways. A viewing user can indicate an opinion for the housing as a whole or for any pieces, and a similar mechanism can be used for indicating an opinion on any game object throughout the game, outside of housing as well. The game tracks the popularity of housing or other objects to determine which houses or objects are the most popular or highly-rated. In one implementation, a leader board system can display the results. In another implementation, popular housing is showcased in a public setting, such as in a capital city, and made open to the public (all users). In addition, awards, achievements, or prizes can be given for defined levels of popularity.

In yet another implementation, user housing visibility is controlled by the viewing user's characteristics. In one example, a user can view in a section of town houses that belong to friends of the users, based on a friends list of the user. In another example, a street map reflects the social network of the user. The user's house may be at the center or front, and the first street represents the friends of the user and so has houses belonging to the user's friends. The next street(s) over represent users one step removed from the user—friends of friends—and so has houses belonging to friends of the user's friends, and so on. The layout may dynamically adjust (or between visits to the housing district) as friend relationships change. In another example, the visible housing is determined by preferences indicated by the user, such as color, theme, and player age.

In another implementation, the visibility of objects may also be determined by the viewing user's characteristics. For example, a user may define rules that certain objects in the user's housing are only visible to the user's friends and that some objects are only visible to specific people, e.g., a secret door only visible to friends. The same filtering or phasing could also be applied to a user's equipment or character appearance, e.g., outside of user housing. In another example, the appearance of a user's character can vary depending on the social network relationship between the users, e.g., friends' character names will appear in the UI in bright blue letters, and friends of friends' character names may appear in a dimmer blue, and so on, until a threshold is reached and character names are shown in gray.

In yet another implementation according to present principles, it is noted that people enjoy affecting their environment and this is also true in online and game or simulation environments. Having lasting impacts on the environment enhances the experience for players. In a single player environment, changes caused by the player are less difficult to manage. However, managing the various possibilities when multiple independent players are causing changes can be complicated for the environment managers and designers.

In one implementation according to present principles, a computer system provides structures and interfaces to manage an environment, such as in a multiplayer game or simulation. A persistence management tool in conjunction with the main game systems may be employed to control the effects of player actions in the environment.

Various types of persistences may be tracked. One type of persistence is the effect a player's actions have on non-player characters. In one implementation, a non-player character may have awareness that a subject player has performed or not performed certain actions, either related to the non-player character or not. This awareness can affect the non-player character actions with respect to that acting subject player or to other players as well. In one implementation, certain acts are defined as persistent acts and a record of whether the player has performed these persistent acts is stored with the character information. Non-player characters can access this information when interacting with the player's character. Some persistent acts are treated as global acts. A record of which player(s) has completed these global acts is stored as part of the environment and is accessible to all non-player characters. These persistent and global acts can also affect the development of storylines, world events, or branching sequences of actions.

Another type of persistence is the effect of changes to the environment caused by players. In one implementation, players can create new objects and place them in the environment, or modify or destroy existing objects in the environment. For example, a player can build a house, paint a friend's house, and then burn down an enemy's house. Changes to the environment can be incorporated into the environment permanently, e.g., until they change again, and may be apparent to all players. Changes can be treated as temporary and may revert after a period of time. Changes can be treated as private and may only be visible to the player who made the change, which is referred to as "phasing". In one implementation, some acts of creation, modification, and destruction of objects can be treated as persistent acts, information stored with the character, and as global acts, information stored with the environment. These acts can then again affect the actions of non-player characters, storylines, world events, and branching actions, as noted above.

Accordingly, the actions of players can change how a player experiences and interacts with the environment and the non-player characters in it. In another example, a world event begins and players have an opportunity to participate in various activities. One of the activities involves a persistent act. A player does not participate and so has a record of not performing that persistent act. In another example, building a house on a specific hill is defined as a global persistent act. If that house is built, certain other events will take place. If the house is never built, the events will not take place. If the house were built but then destroyed, different events will take place.

In another aspect of persistence, social networks may be maintained for non-player characters. The actions of players affect these social networks and the non-player characters use the social network information to determine how to act, e.g., have they met a player, are they friends, does the non-player character care that someone was killed, and so on. For example, a non-player character may feel comfortable telling a player something because that player is friends with the non-player character's brother or friends with a player that is a friend of the non-player character.

Additional variations and implementations are also possible. The systems and techniques described above are not limited to the specific examples herein. For example, while discussed in the context of games and simulations, other implementations can include other contexts such as online environments, social networking, communication, mobile platforms, or shopping. While a particular way of constructing objects or templates has been alluded to, i.e., building with constituent blocks, it will be understood that other ways of such creation of digital objects may also be employed. For example, a user could create an object outside of the online environment, e.g., using Maya®, and the same may be appropriately converted for use in the online environment. Such may then be used as a digital template, object, component, subcomponent, or the like. Similarly, other variations are also possible and will be readily apparent to those of skill in the art in light of this new disclosure.

The system and method may be fully implemented in any number of computing devices. Typically, instructions are laid out on computer-readable media, generally non-transitory, and these instructions are sufficient to allow a processor in the computing device to implement the method of the invention. The computer-readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touch screen, joystick, track pad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provides separate inputs to the system and method.

One implementation includes one or more programmable processors and corresponding computer system components to store and execute computer instructions and data, such as to provide the structures, systems, and interfaces to share and control access to and spreading of the digital items, as well as to track and manage player character and non-player character actions, e.g., storing and using data for persistent acts. One such computing environment is disclosed below.

Figure 10:
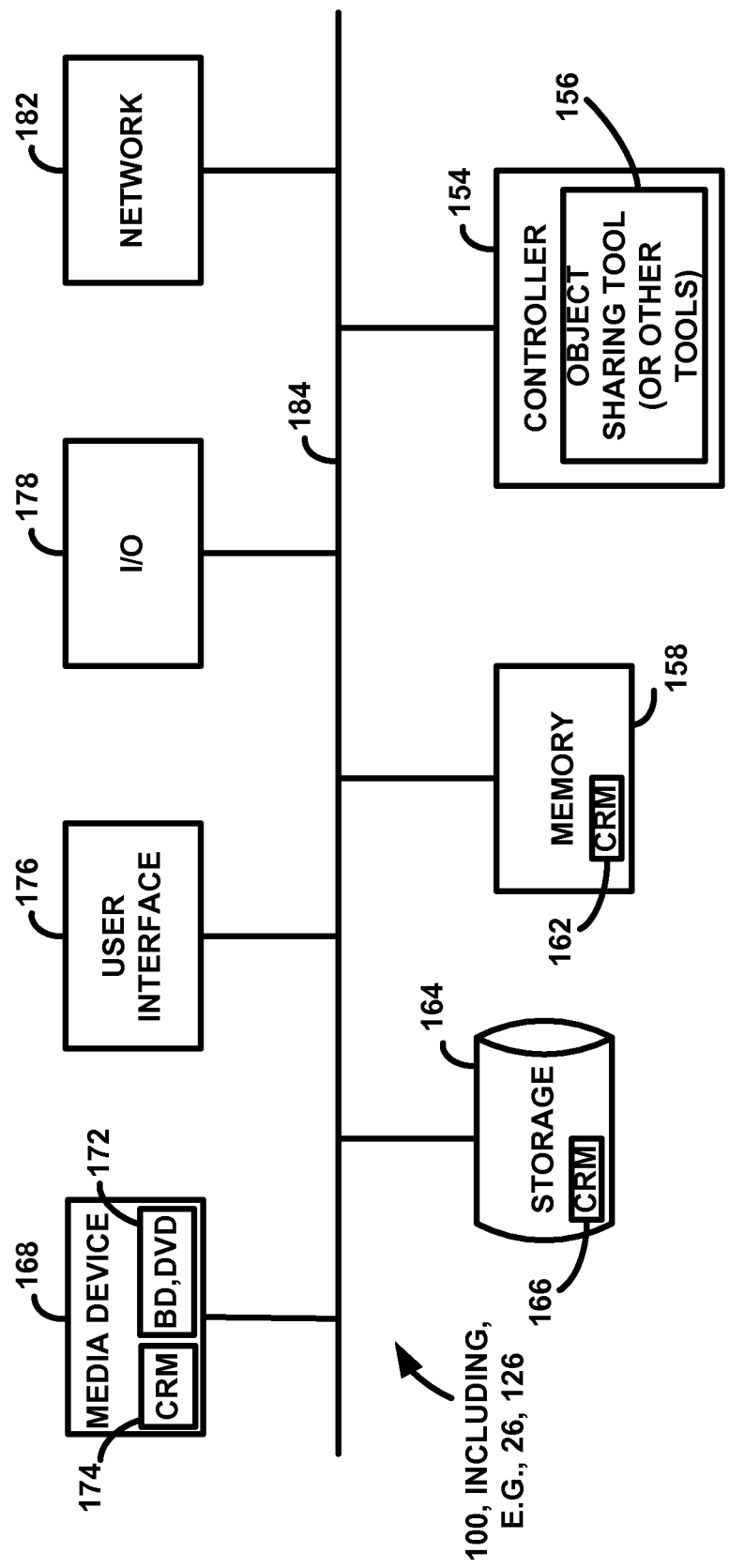
FIG. 10 is an exemplary computing environment in which the methods according to present principles may be implemented.

Referring to FIG. 10, a representation of an exemplary computing environment 100 in which the system and method may be implemented is illustrated.

The computing environment 100 includes a controller 154, a memory 158, storage 164, a media device 168, a user interface 176, an input/output (I/O) interface 178, and a network interface 182. The components are interconnected by a common bus 184. Alternatively, different connection configurations can be used, such as a star pattern with the controller at the center.

The controller 154 includes a programmable processor and controls the operation of an object sharing tool 156. The controller 154 loads instructions from the memory 158 or an embedded controller memory (not shown) and executes these instructions to control the system.

Memory 158, which may include non-transitory computer-readable memory 162, stores data temporarily for use by the other components of the system. In one implementation, the memory 158 is implemented as DRAM. In other implementations, the memory 158 also includes long-term or permanent memory, such as flash memory and/or ROM.

Storage 164, which may include non-transitory computer-readable memory 166, stores data temporarily or long-term for use by other components of the system, such as for storing data or instructions. In one implementation, the storage 164 is a hard disc drive or a solid state drive.

The media device 168, which may include non-transitory computer-readable memory 174, receives removable media and reads and/or writes data to the inserted media. In one implementation, the media device 168 is an optical disc drive or disc burner, e.g., a writable Blu-ray® disc drive 172.

The user interface 176 includes components for accepting user input, e.g., the user indication of digital templates or objects or other aspects discussed above, and presenting a display, e.g., of a potential digital template or object, to the user. In one implementation, the user interface 176 includes a keyboard, a touch screen, a mouse, audio speakers, and a display. The controller 154 uses input from the user to adjust the operation of the computing environment.

The I/O interface 178 includes one or more I/O ports to connect to corresponding I/O devices, such as external storage or supplemental devices, e.g., a printer or a PDA. In one implementation, the ports of the I/O interface 178 include ports such as: USB ports, PCMCIA ports, serial ports, and/or parallel ports. In another implementation, the I/O interface 178 includes a wireless interface for wireless communication with external devices.

The network interface 182 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G/LTE, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method of tracking and benefiting sources of components in transferred digital items in a digital gaming environment, the method comprising:

receiving notification of a transfer of a digital item to a receiving user account, the digital item comprising a plurality of components in the digital gaming environment, wherein at least two of the components are associated with different respective sources, and wherein the notification is received by a server that hosts the digital gaming environment; and executing instructions stored in memory of the server, wherein execution of the instructions by a processor of the server:

compares the digital item associated with the received notification against a registry of digital items, wherein the comparison evaluates a degree of similarity between the digital item associated with the received notification and each of the digital items on the registry, identifies at least one similarity between the digital item associated with the received notification and the respective digital item on the registry, assigns a value to a set of similarities, the set of similarities including each identified similarity, compares the assigned value with respect to a predetermined copying threshold, and in response to the assigned value being identified as less than the predetermined copying threshold:

allows the transfer of the digital item to the receiving user account, constructs an authorized copy of the digital item from the components associated with the different respective sources based on an associated template, and provides a benefit to the different respective sources upon completion of the transfer, the benefit for each source based on a difference between the assigned value and a predetermined benefits threshold for each source; and in response to the assigned value being identified as at least meeting the predetermined copying threshold:

prevents the transfer of the digital item to the receiving user account, wherein the receiving user account is not permitted to construct an authorized copy of the digital item from the components associated with the different respective sources based on the associated template.

2. The method of claim 1, wherein the transfer of the digital item includes an exchange for a compensation, and wherein providing the benefit to the different respective sources includes transferring at least a portion of the compensation to the different respective sources.

3. The method of claim 2, wherein transferring at least the portion of the compensation to the different respective sources includes:

receiving the compensation from a buyer;
associating the compensation with a server account;
receiving a token indicating the digital item to be transferred;
transferring the token to the buyer; and
providing at least the portion of the compensation to the different respective sources.

4. The method of claim 2, wherein the portion of the compensation is apportioned to the respective sources on a basis proportional to a size of a respective component associated with a respective source.

5. The method of claim 2, wherein a size of a respective component pertains to at least one of a surface area, a volume, a visible surface area, a visible volume, a voxel count, a visible voxel count, or a time for construction.

6. The method of claim 4, wherein the proportional basis is proportional to the value of the respective component associated with the respective source.

7. The method of claim 2, further comprising receiving a schedule from a seller, a buyer, the server, or one of the sources, and apportioning at least a portion of the compensation according to the schedule.

8. The method of claim 7, wherein a subsequent transfer of the digital item is permitted to proceed, and wherein the compensation for the subsequent transfer is apportioned at least in part according to the schedule.

9. The method of claim 1, wherein the transfer of the digital item includes debiting a buyer account and crediting a seller account, the buyer account and the seller account associated with player characters in the digital gaming environment.

10. The method of claim 1, wherein the benefit is a recognition benefit.

11. The method of claim 10, wherein the recognition benefit is a badge or an achievement.

12. The method of claim 1, wherein the transferred digital item includes a resultant object.

13. The method of claim 1, wherein the transferred digital item includes a claim.

14. The method of claim 1, wherein at least one of the components is made of at least two subcomponents, each subcomponent associated with a respective source, and wherein providing the benefit to the respective sources includes providing the benefit to the respective sources of the at least two subcomponents.

15. The method of claim 1, wherein no benefit is provided to the respective sources when the transfer of the digital item is prevented.

16. The method of claim 1, wherein the predetermined copying threshold and the predetermined benefits threshold is customizable for each digital item.

17. The method of claim 1, further comprising evaluating at least one other degree of similarity based on at least one of like surface area, like volume, or like visible features.

18. The method of claim 1, further comprising evaluating at least one other degree of similarity as to at least one of overall similarity, component-by-component similarity, or similarity based on a hybrid analysis.

19. The method of claim 1, further comprising allocating a portion of the benefit to each different source, each allocated portion proportional to an amount that the degree of similarity exceeds the predetermined benefits threshold.

20. The method of claim 1, further comprising:

separately tracking information regarding each of the components in the digital item associated with the notification, wherein the separately tracked information includes a number of previous transfers involving a respective component.

21. A non-transitory computer-readable storage medium, having embodied thereon a program executable by a processor to perform a method for tracking and benefiting sources of components in transferred digital items in a digital gaming environment, the method comprising:

receiving notification of a transfer of a digital item to a receiving user account, the digital item comprising a plurality of components in the digital gaming environment, wherein at least two of the components are associated with different respective sources;

comparing the digital item associated with the received notification against a registry of digital items, wherein the comparison evaluates a degree of similarity between the digital item associated with the received notification and each of the digital items on the registry;

identifying at least one similarity between the digital item associated with the received notification and the respective digital item on the registry;

assigning a value to a set of similarities, the set of similarities including each identified similarity;

comparing the assigned value with respect to a predetermined copying threshold; and in response to the assigned value being identified as less than the predetermined copying threshold:

allowing the transfer of the digital item to the receiving user account, constructing an authorized copy of the digital item from the components associated with the different respective sources based on an associated template, and providing a benefit to the different respective sources upon completion of the transfer, the benefit for each source based on a difference between the assigned value and a predetermined benefits threshold for each source; and in response to the assigned value being identified as at least meeting the predetermined copying threshold:

preventing the transfer of the digital item to the receiving user account wherein the receiving user account is not permitted to construct an authorized copy of the digital item from the components associated with the different respective sources based on the associated template.

* * * * *